United States Patent
Brown et al.

(10) Patent No.: US 10,114,551 B2
(45) Date of Patent: Oct. 30, 2018

(54) SPACE RECLAMATION IN ASYNCHRONOUSLY MIRRORED SPACE-EFFICIENT SECONDARY VOLUMES

(71) Applicant: International Business Machines Corporation, Armonk, NY (US)

(72) Inventors: Theresa M. Brown, Tucson, AZ (US); Gregory E. McBride, Vail, AZ (US); Carol S. Mellgren, Tucson, AZ (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 14/997,707

(22) Filed: Jan. 18, 2016

(65) Prior Publication Data

US 2017/0206020 A1    Jul. 20, 2017

(51) Int. Cl.
*G06F 3/06* (2006.01)

(52) U.S. Cl.
CPC ............ *G06F 3/0608* (2013.01); *G06F 3/065* (2013.01); *G06F 3/067* (2013.01); *G06F 3/0665* (2013.01)

(58) Field of Classification Search
CPC ...... G06F 3/0608; G06F 3/0629; G06F 3/067; G06F 3/0683
See application file for complete search history.

(56) References Cited

U.S. PATENT DOCUMENTS

| | | | |
|---|---|---|---|
| 5,715,447 A | 2/1998 | Hayashi et al. | |
| 5,884,307 A | 3/1999 | Depledge et al. | |
| 6,304,940 B1 | 10/2001 | Beardsley | |
| 6,636,941 B1 | 10/2003 | Gold et al. | |
| 6,934,725 B1 | 8/2005 | Dings | |
| 7,464,239 B2 | 12/2008 | Hwang et al. | |
| 8,051,259 B2 | 11/2011 | Agombar et al. | |

(Continued)

OTHER PUBLICATIONS

Kampe, Mark, "An Introduction to MVS Volume and File Structure," available at http://www.cs.pomona.edu/~markk/filesystems/mvs.html, Last modified Apr. 6, 2007.

(Continued)

*Primary Examiner* — Nanci N Wong
(74) *Attorney, Agent, or Firm* — Nelson and Nelson; Daniel P. Nelson; Alexis V. Nelson

(57) ABSTRACT

A method for releasing storage space in asynchronously mirrored space-efficient secondary volumes is disclosed. In one embodiment, such a method includes reading a first copy of a free-space data structure stored on a space-efficient secondary volume. The free-space data structure tracks the usage status of storage elements in the space-efficient secondary volume. The method analyzes the first copy to determine which storage elements in the space-efficient secondary volume are not being used. Upon completion of a consistency group on the space-efficient secondary volume, the method reads a second copy of the free-space data structure and compares the first copy to the second copy to determine which storage elements had their usage status change during analysis of the first copy. The method releases storage elements in the space-efficient secondary volume that are not being used. A corresponding system and computer program product are also disclosed.

14 Claims, 11 Drawing Sheets

(56) References Cited

U.S. PATENT DOCUMENTS

| | | | |
|---|---|---|---|
| 8,782,360 B2 | 7/2014 | Cammarata et al. | |
| 8,959,305 B1 * | 2/2015 | Lecrone | G06F 12/023 707/813 |
| 2007/0033361 A1 * | 2/2007 | Abdulvahid | G06F 11/1458 711/165 |
| 2007/0266037 A1 | 11/2007 | Terry et al. | |
| 2009/0106248 A1 | 4/2009 | Vaghani et al. | |
| 2011/0283077 A1 | 11/2011 | Cammarata et al. | |
| 2012/0047108 A1 * | 2/2012 | Mandel | G06F 3/0607 707/639 |
| 2013/0159647 A1 * | 6/2013 | Kabano | G06F 17/30138 711/162 |
| 2013/0185514 A1 | 7/2013 | Benhase et al. | |
| 2014/0189233 A1 | 7/2014 | Agombar et al. | |
| 2014/0344526 A1 | 11/2014 | Brown et al. | |
| 2015/0058547 A1 | 2/2015 | Thatcher et al. | |
| 2015/0081994 A1 * | 3/2015 | Christopher | G06F 11/1458 711/162 |
| 2015/0100720 A1 | 4/2015 | Flynn et al. | |

OTHER PUBLICATIONS

List of IBM Patents or Patent Applications Treated as Related.

* cited by examiner

SPACE RECLAMATION IN ASYNCHRONOUSLY MIRRORED SPACE-EFFICIENT SECONDARY VOLUMES

BACKGROUND

Field of the Invention

This invention relates to systems and methods for reclaiming space in asynchronously mirrored space-efficient secondary volumes.

Background of the Invention

On storage systems such as the IBM DS8000™ enterprise storage system, space-efficient volumes may be used to more efficiently utilize storage space. A space-efficient volume differs from a standard volume in that data is not physically stored in the volume. Rather, the space-efficient volume is a virtual volume whose data is physically stored in a common repository. A mapping structure keeps track of where a space-efficient volume's data is physically located in the repository. Stated otherwise, the mapping structure maps logical tracks of the space-efficient volume to physical tracks of the repository. From the perspective of a host device or other external system, reading from or writing to a space-efficient volume may be the same as reading from or writing to a standard volume.

While physical storage space may be allocated to space-efficient volumes when needed, the same physical storage space may be reclaimed from the space-efficient volumes when it is no longer needed. Currently, when tracks are deleted by host-system-based software, the DS8000™ storage controller relies on updates to its metadata to release the tracks from a space-efficient volume. More specifically, the DS8000™ storage controller relies on certain metadata associated with the tracks to be overwritten with zeros or marked to indicate that the tracks need to be removed from the space-efficient volume. This metadata is later scanned by the storage controller to identify which tracks should be removed. Once identified, the storage controller may add the tracks to a free storage pool to be used for future allocations. Over time, events such as errors or miscommunications may occur which may result in the required metadata not being zeroed out correctly. For example, if software on a host system deletes a data set or particular tracks of a data set, the software on the host system may notify the storage controller so that the storage controller can release the tracks back into the free storage pool. If the notifications from the software are lost or not properly registered or handled by the storage controller, the tracks may not be released back into the free storage pool. Over time this may result in storage space in the storage system that is not utilized, but nevertheless tied up and unavailable for use.

In view of the foregoing, what are needed are systems and methods to more effectively reclaim space in space-efficient volumes. Ideally, such systems and methods will prevent situations where tracks, even though deleted or marked as unused by a host system, are not released to a free storage pool by the storage controller. Yet further needed are systems and methods to reclaim space in space-efficient volumes used in synchronous and asynchronous data replication environments. For example, systems and methods are needed to reclaim space in asynchronously mirrored space-efficient secondary volumes.

SUMMARY

The invention has been developed in response to the present state of the art and, in particular, in response to the problems and needs in the art that have not yet been fully solved by currently available systems and methods. Accordingly, the invention has been developed to provide systems and methods to release storage space in space-efficient secondary volumes. The features and advantages of the invention will become more fully apparent from the following description and appended claims, or may be learned by practice of the invention as set forth hereinafter.

Consistent with the foregoing, a method for releasing storage space in asynchronously mirrored space-efficient secondary volumes is disclosed. In one embodiment, such a method includes reading a first copy of a free-space data structure stored on a space-efficient secondary volume. The free-space data structure tracks the usage status of storage elements in the space-efficient secondary volume. The method analyzes the first copy to determine which storage elements in the space-efficient secondary volume are not being used. The method then waits for a consistency group on the space-efficient secondary volume to complete. Upon completion of the consistency group, the method reads a second copy of the free-space data structure and compares the first copy to the second copy to determine which storage elements had their usage status change during analysis of the first copy. The method releases storage elements in the space-efficient secondary volume that are not being used.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
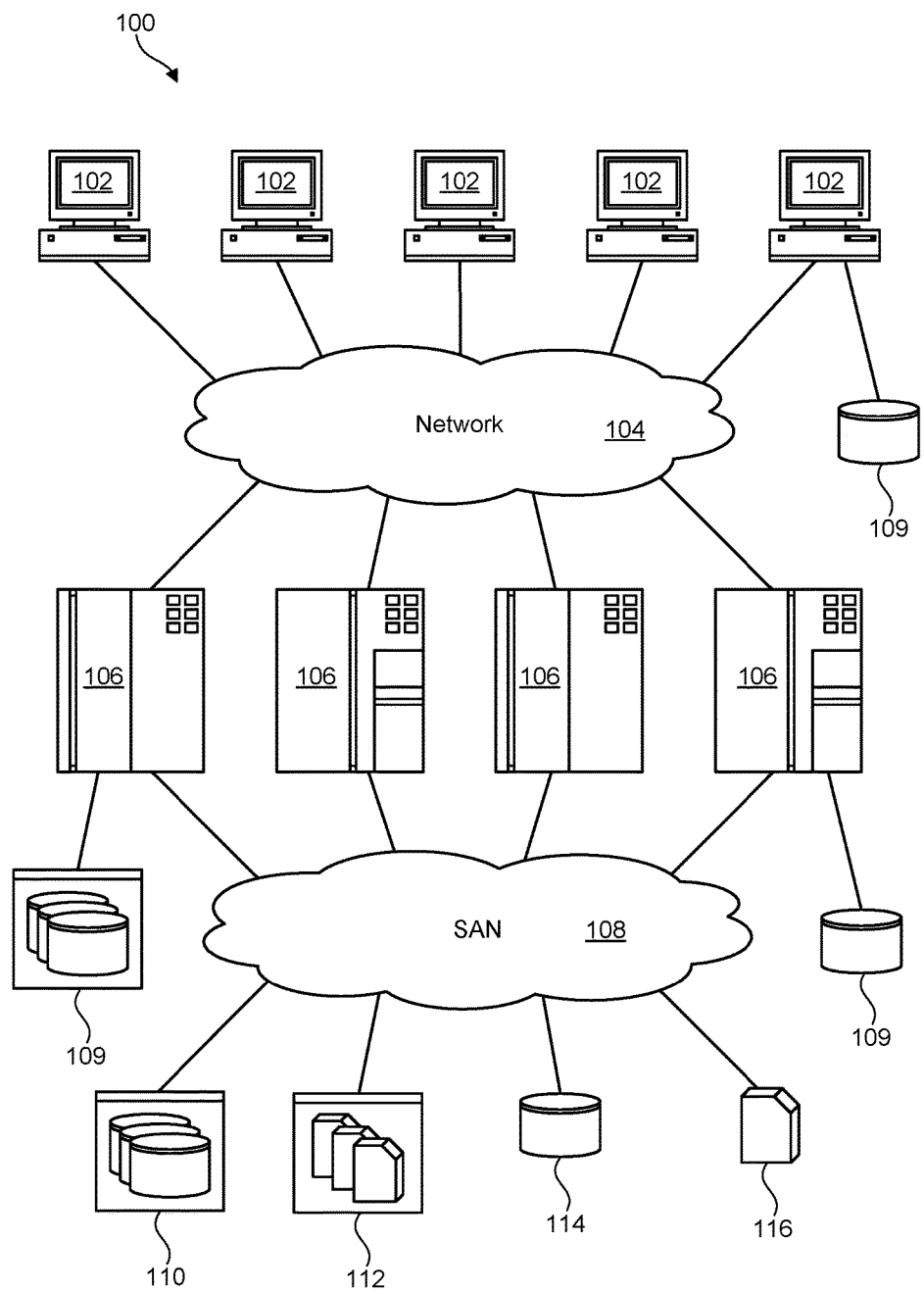
FIG. 1 is a high-level block diagram showing one example of a network architecture in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network architecture 100 is illustrated. The network architecture 100 is presented to show one example of an environment where systems and methods in accordance with the invention may be implemented. The network architecture 100 is presented only by way of example and not limitation. Indeed, the systems and methods disclosed herein may be applicable to a wide variety of network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays of hard-disk drives, solid-state drives, tape drives, etc.). These computers 102, 106 and direct-attached storage systems 109 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
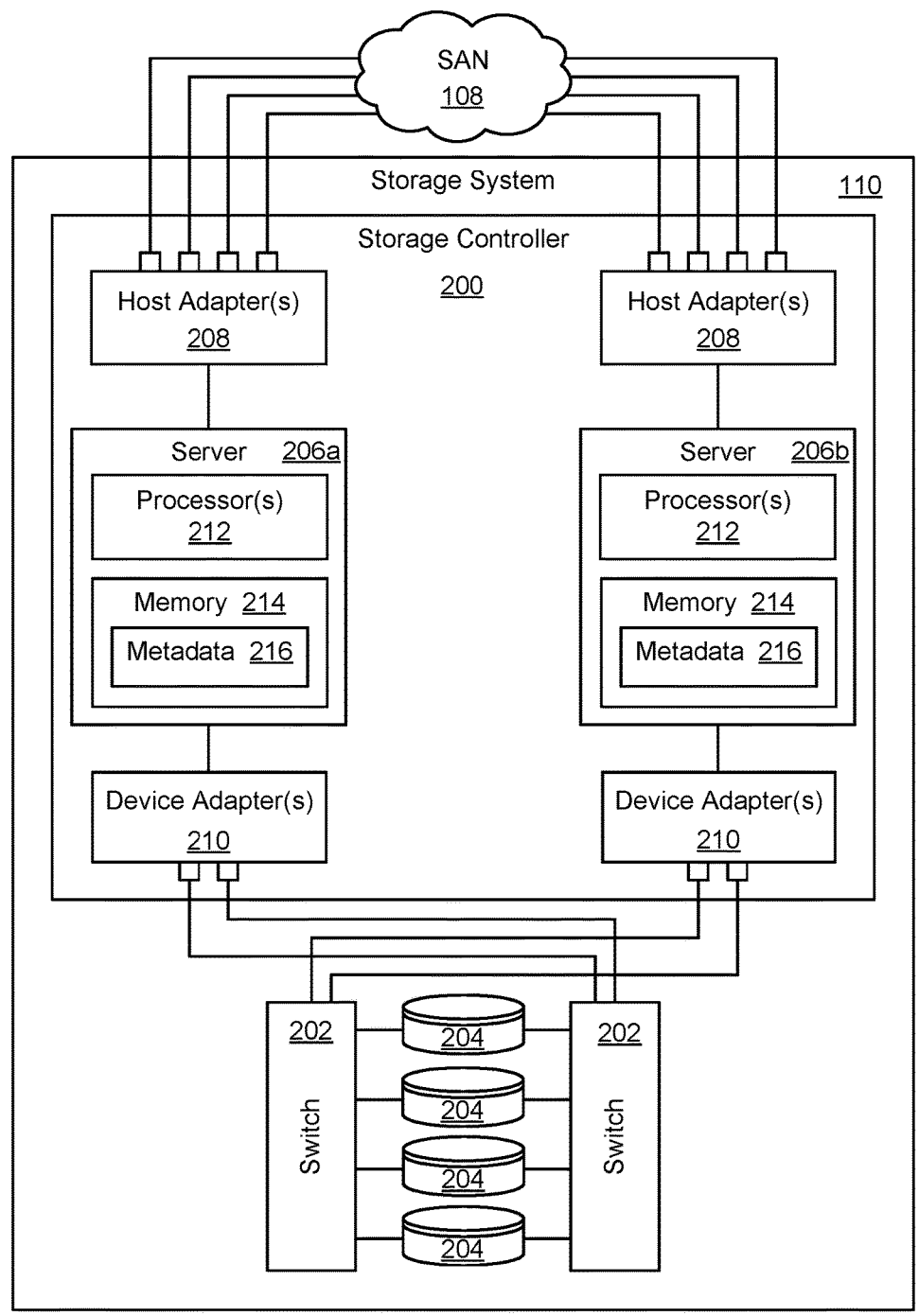
FIG. 2 is a high-level block diagram showing one example of a storage system hosting one or more space-efficient volumes.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106 running operating systems such as MVS, z/OS, or the like) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
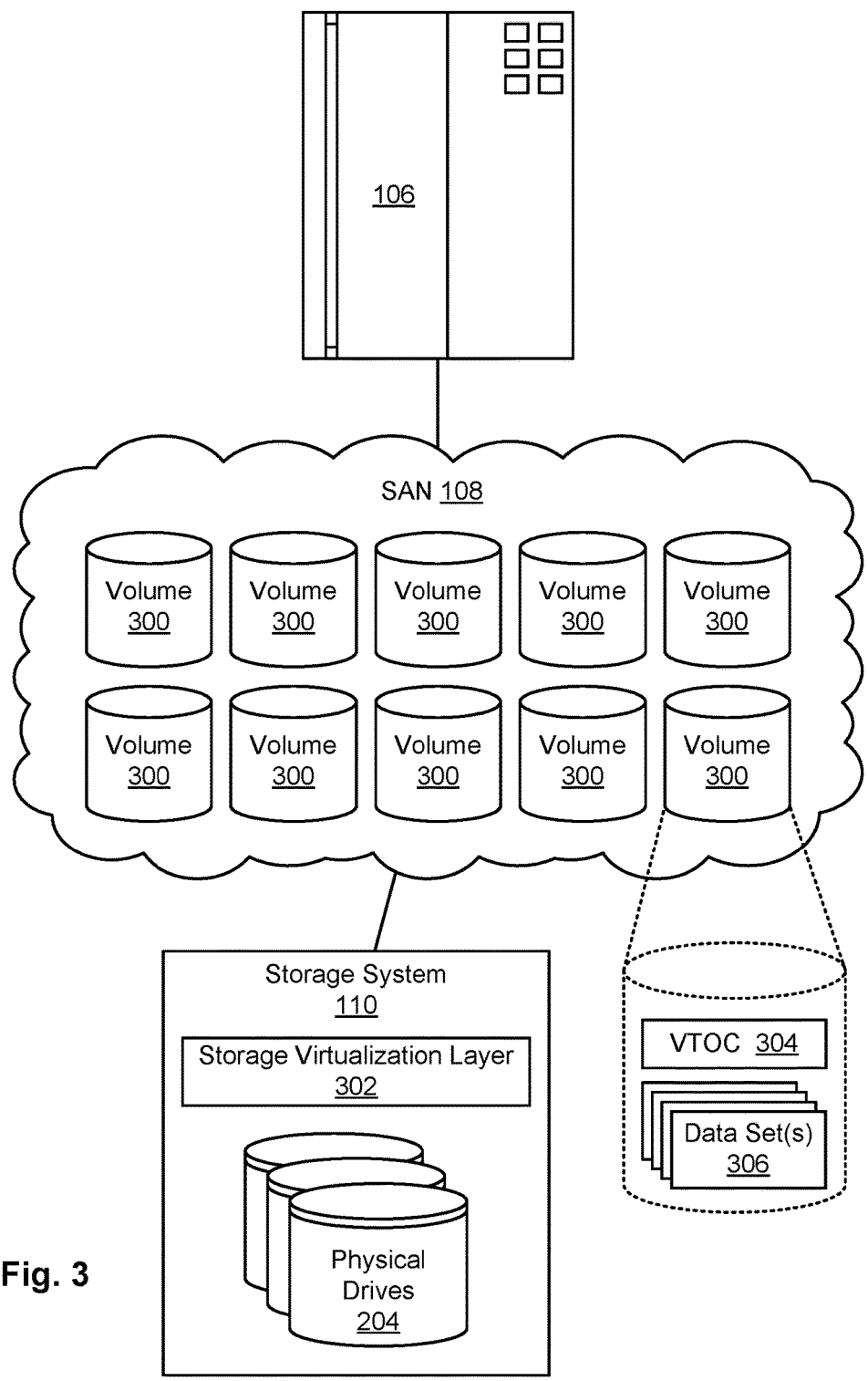
FIG. 3 is a high-level block diagram showing logical volumes exposed by the storage system, and particularly showing a volume table of contents (VTOC) and data sets stored on a logical volume.

Referring to FIG. 3, in certain embodiments, a storage system 110 such as that illustrated in FIG. 2 may be configured to present or expose one or more volumes 300 to a host system 106. The volumes 300 may be logical volumes 300, meaning that the volumes 300 may appear to be physical drives 204 (e.g., hard drives, solid state drives, etc.) to a host system 106 but do not necessarily directly correlate to physical drives 204 on the storage system 110. For example, in certain embodiments, a physical drive 204 may be used by more than one logical volume 300 or a logical volume 300 may span all or part of multiple physical drives 204. A storage virtualization layer 302 within the storage system 110 or may expose the logical volumes 300 and handle the mapping between the logical volumes 300 and the physical drives 204.

As further shown in FIG. 3, in certain embodiments, each logical volume 300 may store a volume table of contents (VTOC) 304 and one or more data sets 306. A VTOC 304 may contain information for locating data sets 306 on the associated logical volume 300. In certain embodiments, the VTOC 304 is located at the beginning of the logical volume 300 and may list the names of each data set 306 on the logical volume 300 as well as the data set's size, location, and permissions. The VTOC 304 may also store information describing each area of contiguous free space in the logical volume 300. The VTOC 304 is typically created at the time the logical volume 300 is initialized.

To access a particular data set 306 on a storage system 110, a host 106 may query a host-based catalog to determine the logical volume 300 on which the data set 306 resides. Once the correct logical volume 300 is determined, the host 106 locates the VTOC 304 on the logical volume 300 and searches the VTOC 304 to determine where the data set 306 is stored. The host 106 may then access the data set 306 at the determined location.

In general, a host 106 and host-system-based software is able to recognize, understand, and utilize the VTOC 304 to access data sets 306 on the logical volume 300. However, the storage controller 200 hosting the logical volume 300 typically will not recognize or understand the VTOC 304. Instead, the storage controller 200 may store and maintain internal metadata 216 (See FIG. 2) in its memory 214 to understand the configuration of a logical volume 300.

Figure 4:
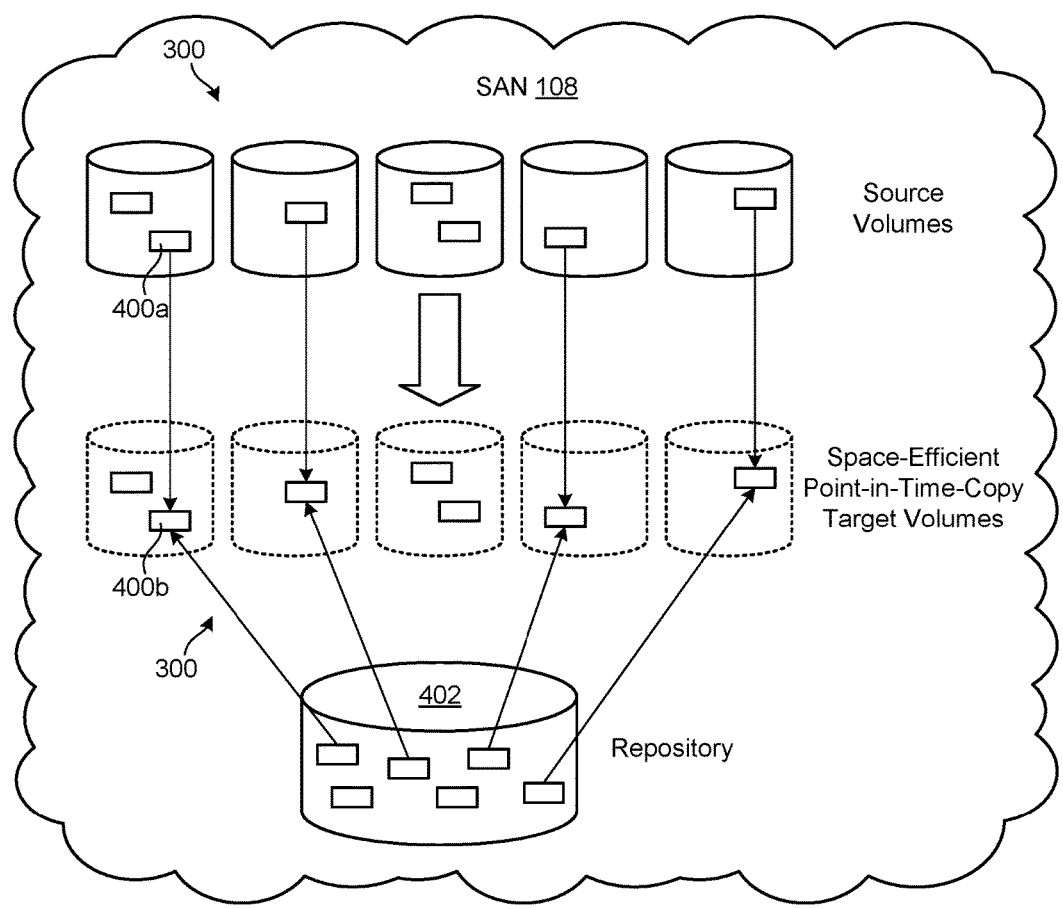
FIG. 4 is a high-level block diagram showing use of space-efficient logical volumes for storing point-in-time copies.

Referring to FIG. 4, on storage systems such as the IBM DS8000™ enterprise storage system, FlashCopy is a function used to create nearly instantaneous point-in-time copies of volumes 300 or data sets 306 on a storage system 110. These point-in-time copies may be used for backups or other purposes. Once created, the point-in-time copies are immediately available for both read and write access to host systems 106. Space Efficient FlashCopy is a function similar to conventional FlashCopy except that space-efficient volumes 300 created with this function are not allocated all their defined storage space at the time of creation. Rather, storage space is allocated when data is actually written to a space-efficient volume 300.

FIG. 4 shows a scenario where space-efficient logical volumes 300 (shown with the dotted lines) are created to store point-in-time copies of data in corresponding source logical volumes (shown with solid lines). When the space-efficient logical volumes 300 are created, no physical space may be allocated to the space-efficient logical volumes 300. Rather, space may be allocated to the space-efficient logical volumes 300 on an as-need basis. For example, when new data is written to a track 400a of a source logical volume 300, the old data in the track 400a may be copied over to the associated space-efficient logical volume 300 in order to preserve the point-in-time copy of the data.

When the data is copied over, a track 400b may be allocated to the space-efficient logical volume 300 from a repository 402 of free tracks in order to store the old data. In this way, tracks may be allocated to space-efficient logical volumes 300 if and when they are needed, providing more efficient utilization of storage space. This also allows the space-efficient logical volumes 300 to be over-provisioned, meaning that the space-efficient logical volumes 300 may be logically larger than the amount of physical storage space backing them.

When a track is no longer being used in a space-efficient logical volume 300, such as when a track of data or an entire data set 306 has been deleted from the space-efficient logical volume 300, the track may be released to the repository 402 so that it can be used again either in the same or different space-efficient logical volume 300. In conventional implementations, if a host system 106 or host-system-based software deletes data, a volume space manager 508 (See FIG. 5) on the host system 106 updates the VTOC 304 to indicate that the storage space used to store the data is no longer in use. The volume space manager 508 then notifies the storage controller 200 that the storage space is no longer being used. A space reclamation module 510 (See FIG. 5) on the storage controller 200 may, in turn, update the track or tracks formerly used to store the data (such as by writing all zeros to the track or tracks) or update the internal metadata 216 of the storage controller 200 to indicate that the tracks are no longer in use. The space reclamation module 510 may then periodically scan the tracks and/or the metadata 216 to determine which tracks have been zeroed out or marked, and then release the tracks to the repository 402 so that they can be used again.

Unfortunately, scenarios may occur where storage space that is freed by a volume space manager 508 on the host system 106 is not released to the repository 402 by the storage controller 200. Because the space reclamation module 510 on the storage controller 200 relies on notifications from the volume space manager 508 on the host system 106 to identify tracks to release to the repository 402, these tracks may not be released if the notifications are not received or logged correctly by the storage controller 200. Lost or incorrectly logged notifications may be the result of errors, miscommunications, code glitches, or the like. Over time, tracks that are not properly released may result in storage space in the storage system 110 that is not utilized, but nevertheless tied up and unavailable for use.

Figure 5:
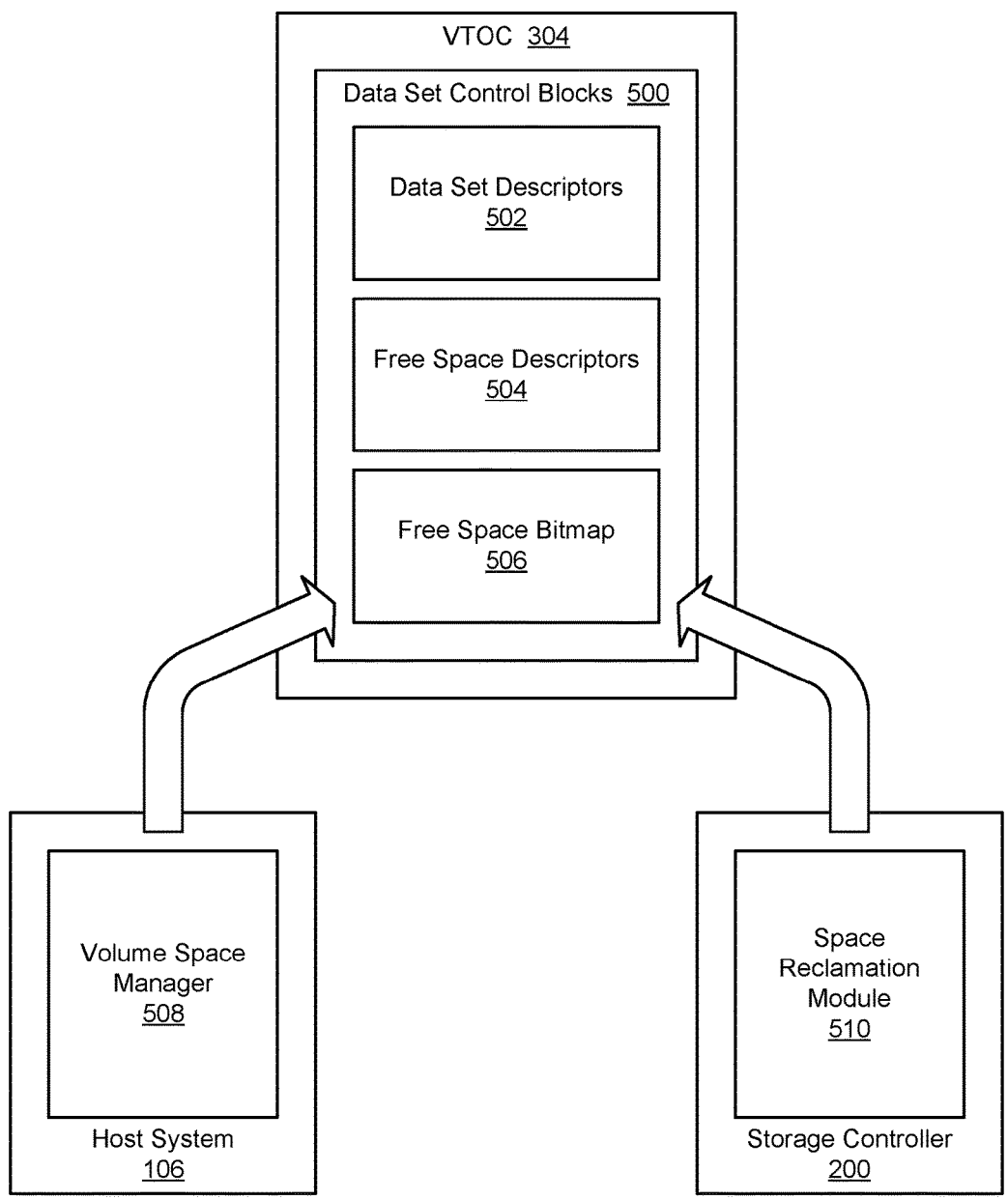
FIG. 5 is a high-level block diagram showing use of a free space bitmap by both a host system and storage controller.

Referring to FIG. 5, in certain embodiments in accordance with the invention, a new data structure may be created that allows a host system 106 and storage controller 200 to coordinate the release of storage space back to the repository 402. In certain embodiments, this new data structure may be stored in the VTOC 304 previously discussed. Since a storage controller 200 may not normally recognize and/or understand a VTOC 304, various mechanisms may be put in place to enable a space reclamation module 510 on the storage controller 200 to identify and utilize the new data structure in the VTOC 304. In other embodiments, the new data structure is located on a space efficient logical volume 300 outside of a VTOC 304, such as in a data set 306 or other location external to the VTOC 304.

In certain embodiments, the new data structure is a bitmap 506, where each bit in the bitmap 506 represents a storage area in a space-efficient logical volume 300. For example, each bit in the bitmap 506 may represent a track in the space-efficient logical volume 300. When a host system 106 or host-system-based software uses or releases a track, the volume space manager 508 on the host system 106 may mark the corresponding bit in the bitmap 506 to indicate that the track is either used or unused. The space reclamation module 510 on the storage controller 200 may, in turn, periodically scan the bitmap 506 to determine which tracks to release to the repository 402. If a bit for a track is marked as unused, the space reclamation module 510 may release the corresponding track to the repository 402. In certain embodiments, the bitmap 506 is embodied as a new type of data set control block (DSCB) 500 in the VTOC 304. However, unlike other data set control blocks 500 (e.g., data set descriptor DSCBs 502, free space descriptor DSCBs 504, etc.), the new bitmap 506 may be recognized and utilized not only by a host system 106, but also by a storage controller 200.

When a volume space manager 508 on a host system 106 changes the status of a track in a logical volume 300, such as by changing the track status from used to unused, or unused to used, the volume space manager 508 may update the bitmap 506 to reflect the new status. To accomplish this, the volume space manager 508 may acquire a lock on the track storing the bitmap 506 to ensure that the storage controller 200 or other processes can't access the bitmap 506 while updates are being made. The volume space manager 508 may then update the bitmap 506 to reflect the new status and release the lock when the operation is complete. The space reclamation module 510 in the storage controller 200 may likewise acquire a lock on the bitmap 506 when the bitmap 506 is analyzed or updated. This will ensure that neither the host system 106 nor storage controller 200 overwrites a pending operation. If the storage controller 200 attempts to access the bitmap 506 while the host system 106 has a lock, the storage controller 200 may need to wait until the lock is released to access the bitmap 506, and vice versa.

As mentioned above, various mechanisms may be put in place to enable a storage controller 200 to find and utilize the bitmap 506 on a space-efficient logical volume 300. In one embodiment, the bitmap 506 is created and registered with the storage controller 200 at the time a space-efficient logical volume 300 is initialized. This will allow the storage controller 200 to store the location of the bitmap 506 in its internal metadata 216 so that unused tracks can be determined and released. If a logical volume 300 is reinitialized in a way that changes the location of the bitmap 506, the bitmap 506 may be reregistered with the storage controller 200.

In another embodiment, a unique identifier is stored on the space-efficient logical volume 300*b* with the bitmap. This may enable a storage controller 200 to locate the bitmap by scanning the logical volume 300 for the unique identifier. In yet another embodiment, the storage controller 200 may be updated to have knowledge of the VTOC 304, there enabling the storage controller 200 to scan the VTOC 304 and locate the bitmap 506. Other techniques for enabling the storage controller 200 to locate and identify the bitmap 506 are possible and within the scope of the invention.

Figure 6:
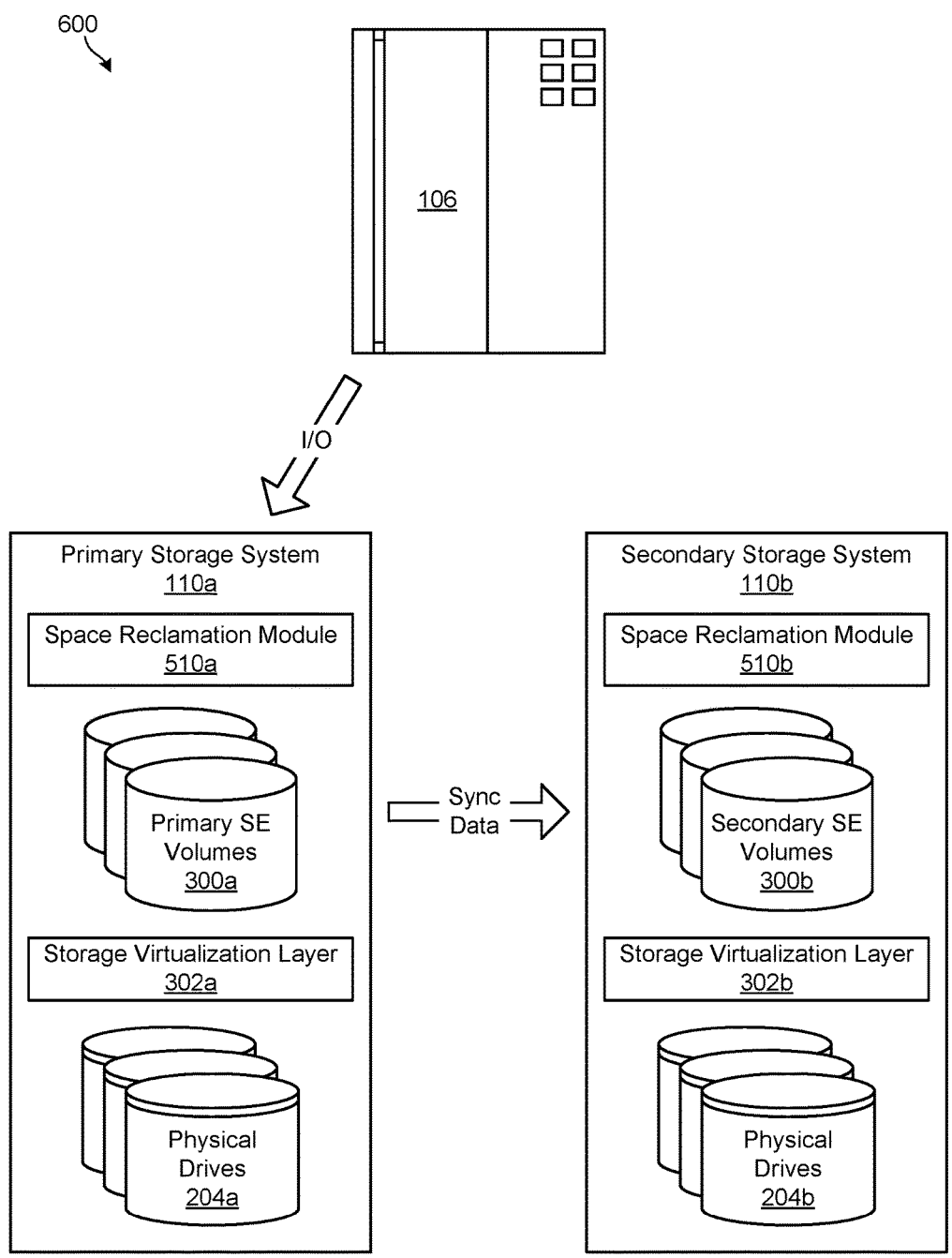
FIG. 6 is a high level block diagram showing one embodiment of a synchronous data replication system comprising primary and secondary storage systems.

Referring to FIG. 6, although the systems and methods described herein have been discussed in relation to space-efficient FlashCopy, a space reclamation module 510 in accordance with the invention may be used to reclaim space in space-efficient volumes 300 more generally. In certain embodiments, a space reclamation module 510 in accordance with the invention may be used in data replication systems, such as synchronous data replication systems, or peer-to-peer remote copy (PPRC) systems, to reclaim space in space-efficient volumes 300 stored thereon. FIG. 6 shows one embodiment of a synchronous data replication system 600, or PPRC system 600, comprising a primary storage system 110*a* and secondary storage system 110*b*. In such a system 600, writes originating from a host system 106 will be written to the primary storage system 110*a* and mirrored to the secondary storage system 110*b*. A write is only considered complete when it has completed to both the primary storage system 110*a* and secondary storage system 110*b*.

For example, when performing a write operation in such a system 600, a host system 106 may send a write request to the primary storage system 110*a*. The write operation may be performed on the primary storage system 110*a*. The primary storage system 110*a* may, in turn, transmit a write request to the secondary storage system 110*b*. The secondary storage system 110*b* may execute the write operation and return a write acknowledge signal to the primary storage system 110*a*. Once the write has completed on both the primary and secondary storage systems 110*a*, 110*b*, the primary storage system 110*a* returns a write acknowledge signal to the host system 106. The I/O is considered complete when the host system 106 receives the write acknowledge signal.

As shown, a space reclamation module 510*a* may be present on the primary storage system 110*a* to reclaim unused space in space-efficient primary volumes 300*a*. Similarly, a space reclamation module 510*b* may be present on the secondary storage system 110*b* to reclaim unused space in space-efficient secondary volumes 300*b*. The space reclamation modules 510*a*, 510*b* may operate independently from one another since resources (e.g., physical storage drives 204*a*, 204*b*, free storage pools, etc.) may differ on the primary and secondary storage systems 110*a*, 110*b*. For example, operations to reclaim unused storage space may run at different times and frequencies on the primary and secondary storage systems 110*a*, 110*b* since the amount of space in their free storage pools (or repository 400) may differ. A storage virtualization layer 302*a*, 302*b* within each of the primary and secondary storage systems 110*a*, 110*b* may expose logical primary and secondary space-efficient volumes 300*a*, 300*b* and handle the mapping between the logical space-efficient volumes 300 and the physical drives 204.

Figure 7:
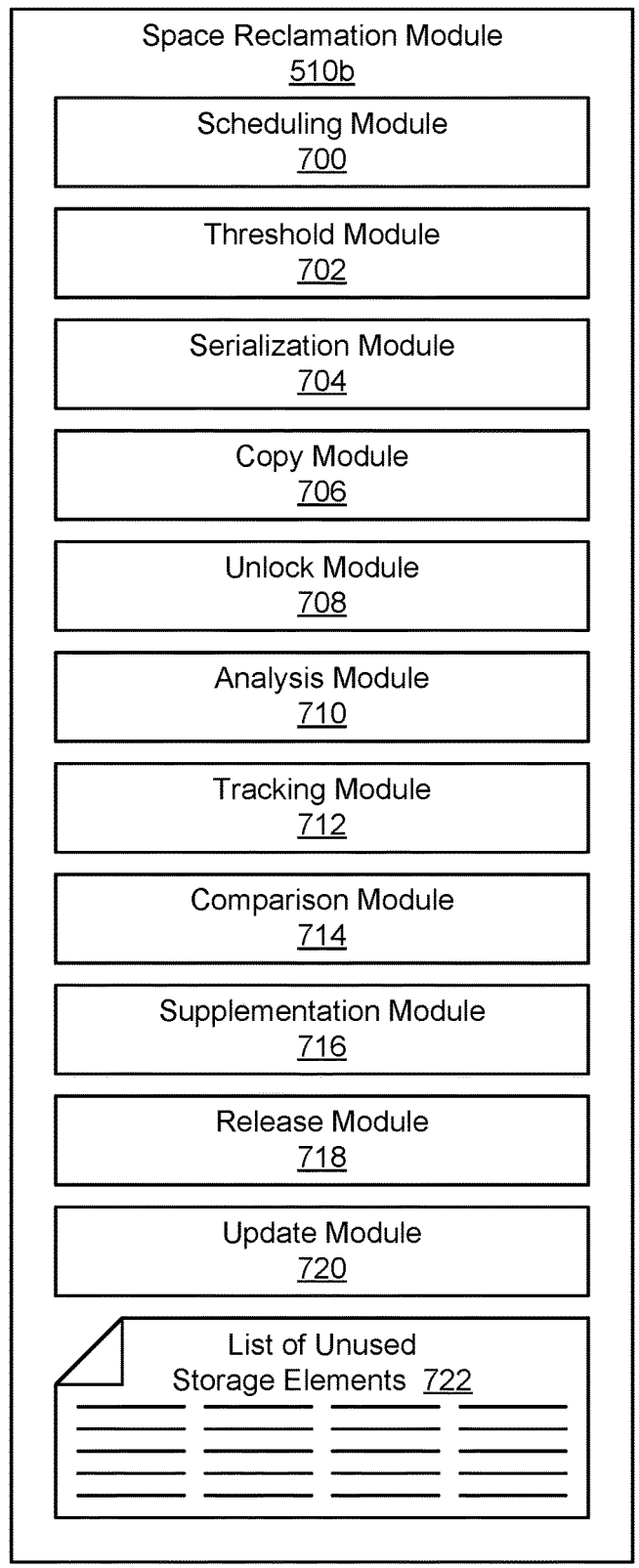
FIG. 7 is a high level block diagram showing various sub-modules that be included in a space reclamation module used on a secondary storage system of the synchronous data replication system.

Referring to FIG. 7, as previously mentioned, in a synchronous data replication system 600 such as that illustrated in FIG. 7, a write operation does not complete and return to the caller (e.g., host system 106) until the write operation has been performed on both the primary and secondary storage systems 110*a*, 110*b*. This also means that free-space data structures (e.g., free space descriptors 504 and/or free space bitmaps 506) in the VTOCs 304 of the primary and secondary volumes 300*a*, 300*b* will mirror each other as long as the primary and secondary volumes 300*a*, 300*b* are in a synchronous state. However, when freeing unused space in a space-efficient secondary volume 300*b*, I/Os to the VTOC 304 of the space-efficient secondary volume 300*b* may need to be held until the process of releasing unused space can complete. This prevents new storage elements (e.g., tracks) from being allocated to the space-efficient secondary volume 300*b* during this period.

In order to minimize time that a VTOC 304 is locked on the secondary storage system 110*b*, logic may be added to the space reclamation module 510*b*. One embodiment of a space reclamation module 510*b* for use on a secondary storage system 110*b* is illustrated in FIG. 7. As shown, the space reclamation module 510*b* includes various sub-modules to provide different features and functions. These sub-modules may include one or more of a scheduling module 700, threshold module 702, serialization module 704, copy module 706, unlock module 708, analysis module 710, tracking module 712, comparison module 714, supplementation module 716, release module 718, and update module 720. The modules may be implemented in hardware, software, firmware, or a combination thereof.

The scheduling module 700 may configured to schedule a space reclamation process for execution on the secondary storage system 110*b*. The space reclamation process may be scheduled to occur at regular intervals (e.g., every x hours or days), at specific times of the day or week, or during periods of reduced I/O. Additionally, or alternatively, a threshold module 702 may be configured to trigger the space reclamation process in response to an amount of free space in a free storage pool of the storage system 110*a* dropping below a specific threshold.

In order to execute the space reclamation process on a space-efficient secondary volume 300*b*, the serialization module 704 may lock the VTOC 304 associated with the space-efficient secondary volume 300*b* so that it can no longer be updated, and the copy module 706 may copy the VTOC 304 and more particularly the free-space data structures of the VTOC 304 into memory of the secondary storage system 110*b*. While this lock is in place, all I/Os to the VTOC 304 may be held or otherwise wait for execution. Once the VTOC 304 is copied into memory, the unlock module 708 may unlock the VTOC 304 to release the I/Os, thereby allowing reads and writes to once again occur to the VTOC 304.

Once the copy of the VTOC 304 is created in memory, the analysis module 710 may analyze the copy rather than the VTOC 304 itself. Specifically, the analysis module 710 may analyze the copy of the free-space data structures within the VTOC 304 to determine what storage elements (e.g., tracks) may be released from the space-efficient secondary volume 300*b*, and returned to the free storage pool. In certain embodiments, the analysis module 710 may search for twenty-one cylinder units (a cylinder includes fifteen tracks) that align with twenty-one cylinder divisions on the storage media, wherein a twenty-one cylinder division is a granular segment that can be released by the space reclamation module 510*b*. In certain embodiments, the analysis module 710 may keep track of unused storage elements in a list 722 while performing its analysis.

While the copy is being analyzed, the tracking module 712 may monitor changes to the VTOC 304, and more particularly to the free-space data structures of the VTOC 304. Such changes may occur, for example, if new space is allocated to the space-efficient secondary volume 300b during the analysis. Once analysis by the analysis module 710 is complete, the serialization module 704 may lock the VTOC 304 and the copy module 706 may read a new copy of the VTOC 304 into memory (or a current copy of the VTOC 304 if it is already in memory, or cache). The comparison module 714 may then compare the new copy, and more particularly the free-space data structures in the new copy, with the list 722 of unused storage elements. This comparison step may determine if the allocation of storage space or usage of storage space within the space-efficient secondary volume 300b changed during the analysis by the analysis module 710. For example, during the analysis, certain storage elements that were formerly used may have become unused, or other storage elements that were formerly unused may have been used, or new storage elements may have been allocated to the space-efficient secondary volume 300b during the analysis. The supplementation module 716 may supplement the list 722 of unused storage elements to reflect these changes, if any are present.

Once the list 722 of unused storage elements is complete, the release module 718 may release unused storage elements identified in the list 722 from the space-efficient secondary volume 300b and return these storage elements to the free storage pool. The update module 720 may then update the VTOC 304 associated with the space-efficient secondary volume 300b to reflect any released storage elements. The unlock module 708 may then unlock the VTOC 304 to enable reads and writes to resume thereto. Because the majority of the analysis of the space reclamation module 510b is performed while a VTOC 304 is unlocked, the space reclamation module 510b may minimize or reduce the amount of time that the VTOC 304 is unavailable for reads and writes.

Figure 8:
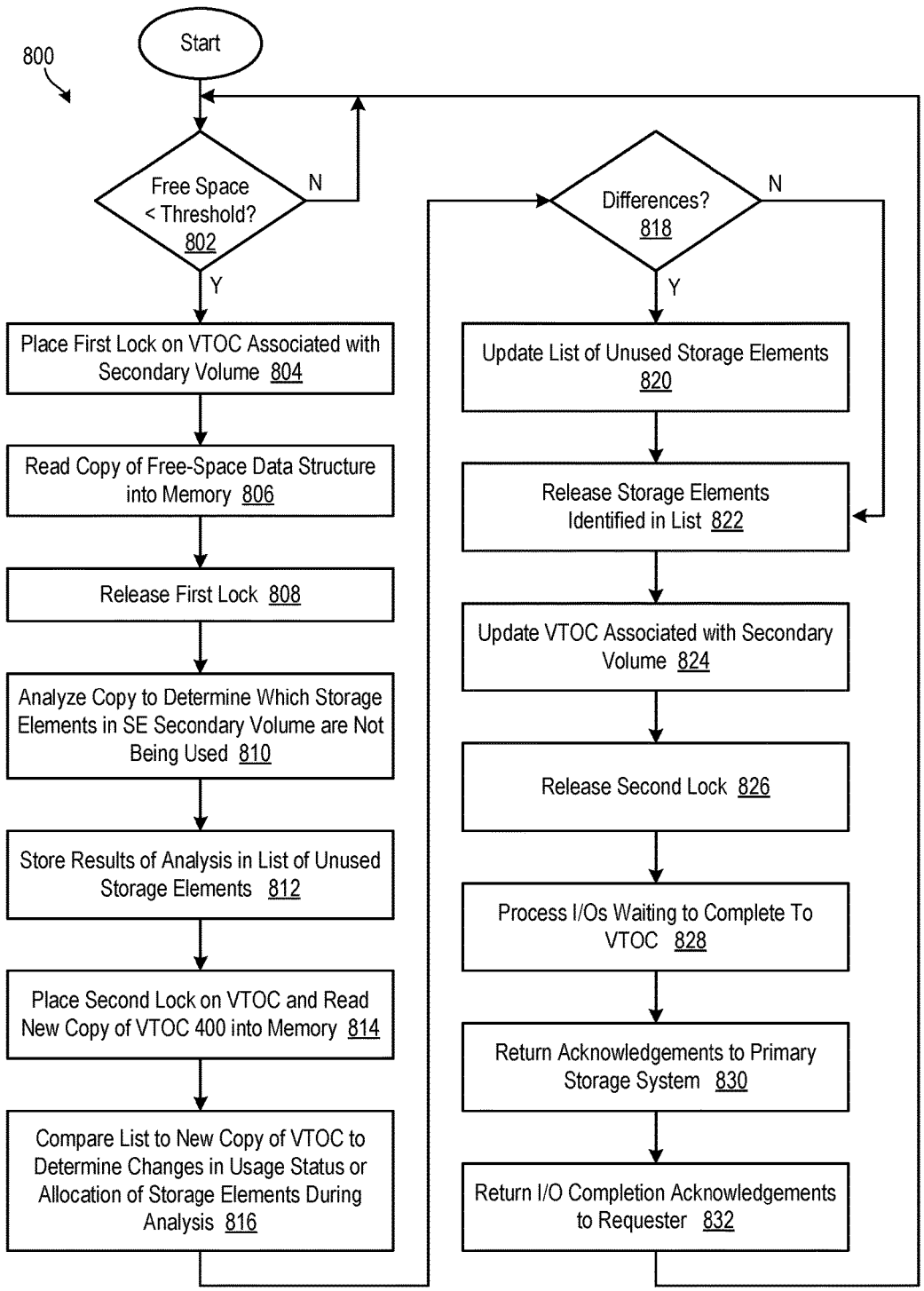
FIG. 8 is a process flow diagram showing one embodiment of a method for reclaiming space in secondary storage volumes in a synchronous data replication system.

Referring to FIG. 8, one embodiment of a method 800 for releasing unused storage space from a space-efficient secondary volume 300b is illustrated. As shown, the method 800 initially determines 802 whether free space on the secondary storage system 110b has fallen below a threshold. If so, the method 800 places 804 a first lock on the VTOC 304 associated with the space-efficient secondary volume 300b and reads 806 a copy of the VTOC 304 into memory. The method 800 then releases 808 the first lock.

The method 800 then analyzes 810 the copy of the VTOC 304 to determine which storage elements in the space-efficient secondary volume 300b are not being used. This step 810 may include analyzing free space descriptor DSCBs 504 and/or the free space bitmap 506 to determine which storage elements (e.g., tracks) are unused. The method 800 stores 812 the results of the analysis in the list 722 of unused storage elements.

The method 800 then places 814 a second lock on the VTOC 304 and reads 814 a new copy of the VTOC 304 into memory. The method 800 then compares 816 the list 722 of unused storage elements to the new copy to determine if any storage elements in the space-efficient secondary volume 300b had a change in usage status (e.g., transitioned from used to unused, unused to used, etc.), or if any new storage elements were allocated to the space-efficient secondary volume 300b during the analysis. If, at step 818, the method finds differences between what is recorded in the list 722 and what is recorded in the new copy of the VTOC 304, the method 800 updates 820 the list 722 of unused storage elements to reflect the changes in the VTOC 304.

The method 800 then releases 822, from the space-efficient secondary volume 300b, storage elements that are identified in the list 722. The VTOC 304 associated with the space-efficient secondary volume 300b is then updated 824 to reflect the released storage elements. The second lock may then be released 826. This allows any held or waiting I/Os to complete 828 to the VTOC 304. This, in turn, will allow acknowledgements to be returned 830 to the primary storage system 110a to indicate that the I/Os to the VTOC 304 completed successfully, which in turn will allow I/O completion acknowledgements to be returned 832 to the requester, such as the host system 106.

Figure 9:
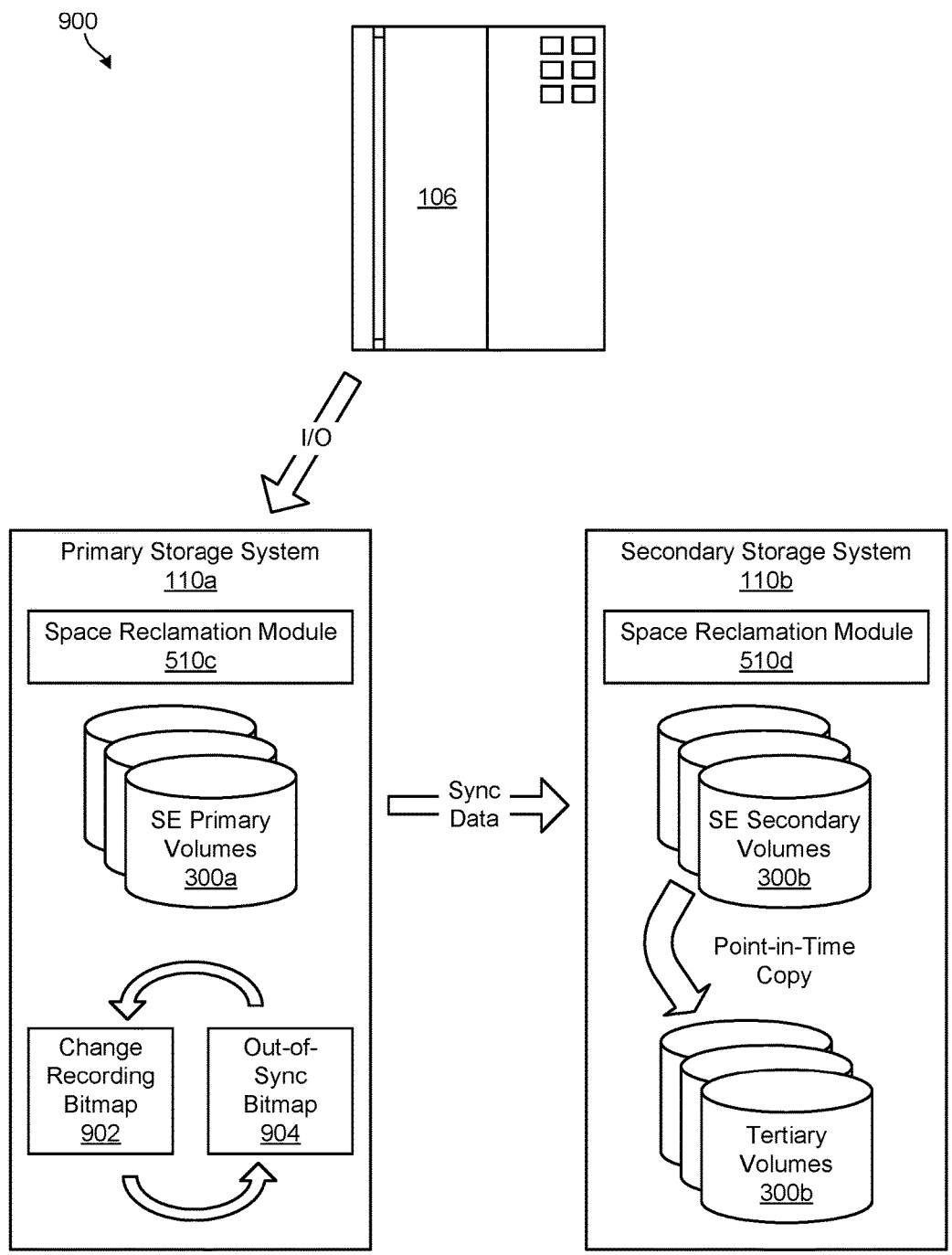
FIG. 9 is a high level block diagram showing one embodiment of an asynchronous data replication system comprising primary and secondary storage systems.

Referring to FIG. 9, a space reclamation module 510 in accordance with the invention may also be used to reclaim space in space-efficient volumes 300 in asynchronous data replication systems. One example of an asynchronous data replication system 900, comprising a primary storage system 110a and secondary storage system 110b, is shown in FIG. 9. In such a system 900, writes originating from a host system 106 may initially be written to the primary storage system 110a, and then mirrored to the secondary storage system 110b as time and resources allow. A write is considered complete when it has completed to the primary storage system 110a. That is, a write acknowledgement may be returned to the host system 106 when the write has completed on the primary storage system 110a but before the write has been mirrored to the secondary storage system 110b. The write may then be asynchronously mirrored to the secondary storage system 110b as time and resources allow.

In certain embodiments, the asynchronous data replication system 900 may be characterized by an "idle phase," "drain phase," and "point-in-time-copy phase." During the idle phase, data that is written to the primary storage system 110a may be asynchronously mirrored to the secondary storage system 110b. During this phase, updates to the primary space-efficient volumes 300a are recorded in a change recording bitmap 902.

When a consistency group is created on the primary space-efficient volumes 300a, the change recording bitmap 902 may be converted to an out-of sync bitmap 904, and the former out-of sync bitmap 904 may be converted to the change recording bitmap 902. This procedure that may be referred to as a "flip." The asynchronous data replication system 900 may then enter the drain phase. During the drain phase, data in storage elements (e.g., tracks) that have been modified (as recorded in the out-of sync bitmap 904) may be copied from the space-efficient primary volume 300a to the space-efficient secondary volume 300b in order to replicate the consistency group to the space-efficient secondary volume 300b.

When all data recorded in the out-of sync bitmap 904 has been successfully copied to the space-efficient secondary volume 300b, the consistency group is complete and the asynchronous data replication system 900 may enter the point-in-time-copy phase. During this phase, a snapshot is taken of data in the secondary space-efficient volume 300b. This snapshot is stored as a point-in-time copy in one or more tertiary volumes 300c. The tertiary volumes 300c may reside on the same storage system 110b as the secondary space-efficient volumes 300b or on a different storage system 110.

As shown in FIG. 9, a space reclamation module 510c may operate on the primary storage system 110a to reclaim space as needed in the primary space-efficient volumes 300a. Similarly, a space reclamation module 510d may operate on the secondary storage system 110b to reclaim space in the secondary space-efficient volumes 300b. These space reclamation modules 510c, 510d may operate independently since resources may differ on the primary and secondary storage systems 110a, 110b. Furthermore, the space reclamation modules 510c, 510d may operate differently based on their position within the asynchronous data replication system 900. For example, the space reclamation module 510c at the primary storage system 110a may operate differently than the space reclamation module 510d at the secondary storage system 110b due to the different functions occurring at each storage system 110.

Figure 10:
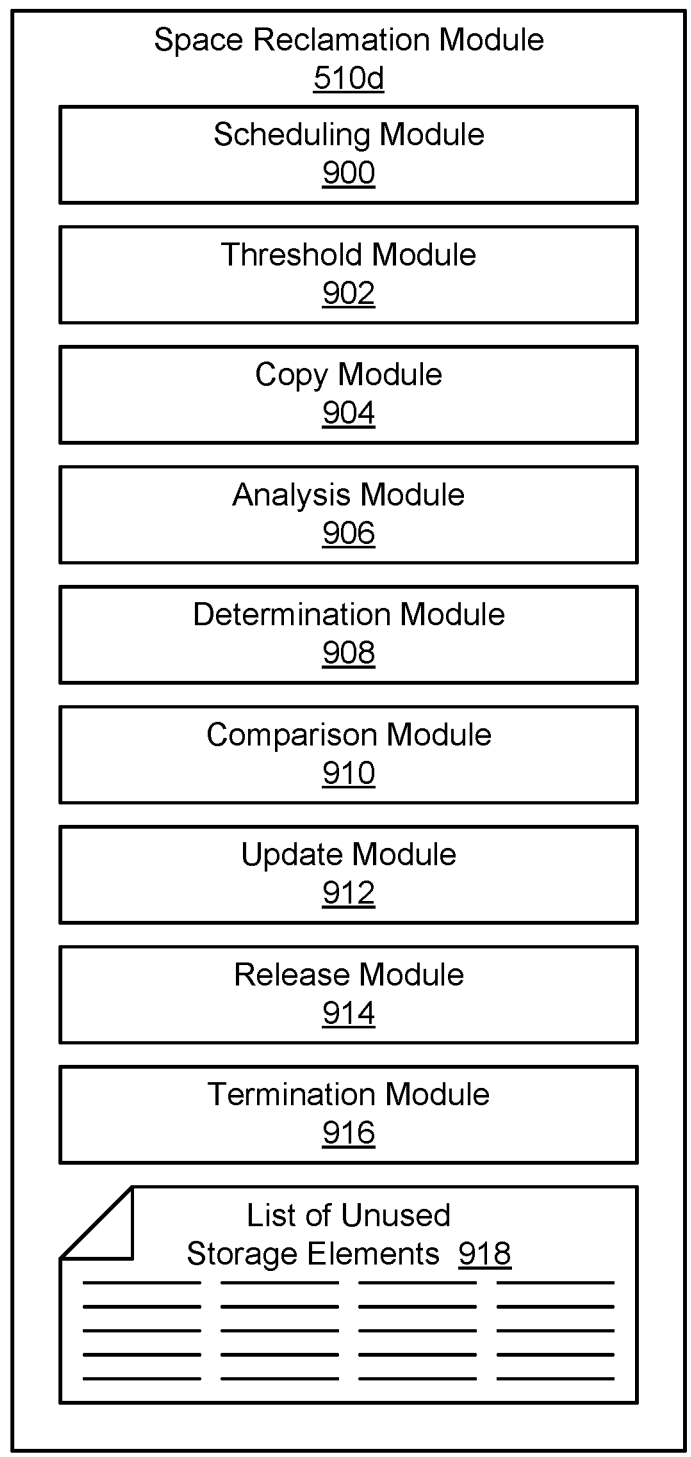
FIG. 10 is a high level block diagram showing various sub-modules that be included in a space reclamation module for reclaiming space in asynchronously mirrored space-efficient secondary volumes.

FIG. 10 shows one embodiment of a space reclamation module 510d configured to operate at a secondary storage system 110b of an asynchronous data replication system 900. As shown, the space reclamation module 510b includes various sub-modules to provide different features and functions. These sub-modules may include one or more of a scheduling module 900, threshold module 902, copy module 904, analysis module 906, determination module 908, comparison module 910, update module 912, release module 914, termination module 916, and update module 917. The modules may be implemented in hardware, software, firmware, or a combination thereof.

The scheduling module 900 may configured to schedule execution of a space reclamation process on the secondary storage system 110b. The space reclamation process may be scheduled to occur at regular intervals, at specific times of the day or week, during periods of reduced I/O, or the like. Additionally, or alternatively, a threshold module 902 may be configured to trigger execution of the space reclamation process in response to an amount of free space in the space-efficient secondary volumes 300b, or a free storage pool, falling below a specific level.

In order to execute the space reclamation process on space-efficient secondary volumes 300b, the copy module 904 may read a first copy of the VTOC 304 at the secondary storage system 110b, and more particularly the free-space data structures of the VTOC 304, into memory of the secondary storage system 110b. The analysis module 906 may then analyze the free-space data structures to determine which storage elements (e.g., tracks) may be released from the space-efficient secondary volume 300b and returned to a free storage pool. In certain embodiments, the analysis module 906 may search for twenty-one cylinder units that align with twenty-one cylinder divisions on the storage media. The twenty-one cylinder division may be a granular segment that can be released by the space reclamation module 510d. In certain embodiments, the analysis module 906 may keep track of unused storage elements in a list 918 while performing the analysis.

The determination module 908 may determine when the idle phase has completed, which is an indicator that a consistency group has been created on the primary storage system 110a. As previously mentioned, at the end of the idle phase, the change recording bitmap 902 and out-of sync bitmap 904 may be flipped, and data associated with the consistency group may be drained (i.e., copied) from the primary space-efficient volume 300a to the secondary space-efficient volume 300b. At the end of the idle phase, the determination module 908 may determine, by examining the change recording bitmap 902 (which is flipped to become the out-of sync bitmap 904), whether the storage element (e.g., track) storing the VTOC 304 was updated. If the VTOC 304 was not updated (indicating that the free-space data structures contained therein also were not updated), then the VTOC 304 at the secondary storage system 110b can be trusted to accurately describe the data on the space-efficient secondary volume 300b. In such a scenario, the release module 914 may begin releasing storage elements in the list 918 of unused storage elements, since this list 918 is accurate and will not change. That is, the release module 914 may release storage elements in the list 918 during the drain phase since the VTOC 304 at the secondary storage system 110b will not change during the drain phase.

If, on the other hand, the change recording bitmap 902 indicates that the VTOC 304 was updated on the space-efficient primary volume 300a, then the VTOC 304 on the space-efficient secondary volume 300b may not accurately reflect data that is stored on the space-efficient secondary volume 300b. In such a scenario, the space reclamation module 510 may wait for the drain phase to complete. When the drain phase completes (indicating that the consistency group on the space-efficient primary volume 300a has been successfully replicated to the space-efficient secondary volume 300b), the VTOC 304 on the space-efficient secondary volume 300b will accurately describe data on the space-efficient secondary volume 300b. At this point, the copy module 904 may read a second copy of the VTOC 304 on the space-efficient secondary volume 300b into memory. The comparison module 910 may then compare the second copy of the VTOC 304, and more particularly the free-space data structures in the second copy, to the list 918 of unused storage elements.

The comparison step may determine if the allocation of storage space or usage of storage space within the space-efficient secondary volume 300b changed during the analysis by the analysis module 906. For example, during the analysis, certain storage elements that were formerly used may have become unused, or other storage elements that were formerly unused may have become used, or new storage elements may have been allocated to the space-efficient secondary volume 300b. The update module 912 may update the list 918 of unused storage elements to reflect any such changes. In certain embodiments, the supplementation module 912 may update the list 918 by removing, from the list 918, any unused storage elements that are associated with changes to the VTOC 304. This is due to the fact that some storage elements that were formerly unused may have become used during analysis by the analysis module 906.

Once the list 918 of unused storage elements is complete, the release module 914 may release unused storage elements identified in the list 918 from the space-efficient secondary volume 300b and return these storage elements to the free storage pool. In certain embodiments, this release may be performed during the point-in-time-copy phase of the asynchronous data replication process. If the point-in-time-copy phase ends before all space has been released from the space-efficient secondary volume 300b, the termination module 916 may terminate the release process even if it has not yet completed. This will ensure that the release process does not extend past the point-in-time-copy phase and possibly into the next idle phase. This will also prevent delays of the next idle phase (thereby avoiding a performance impact) and not adversely affect the recovery point.

Figure 11:
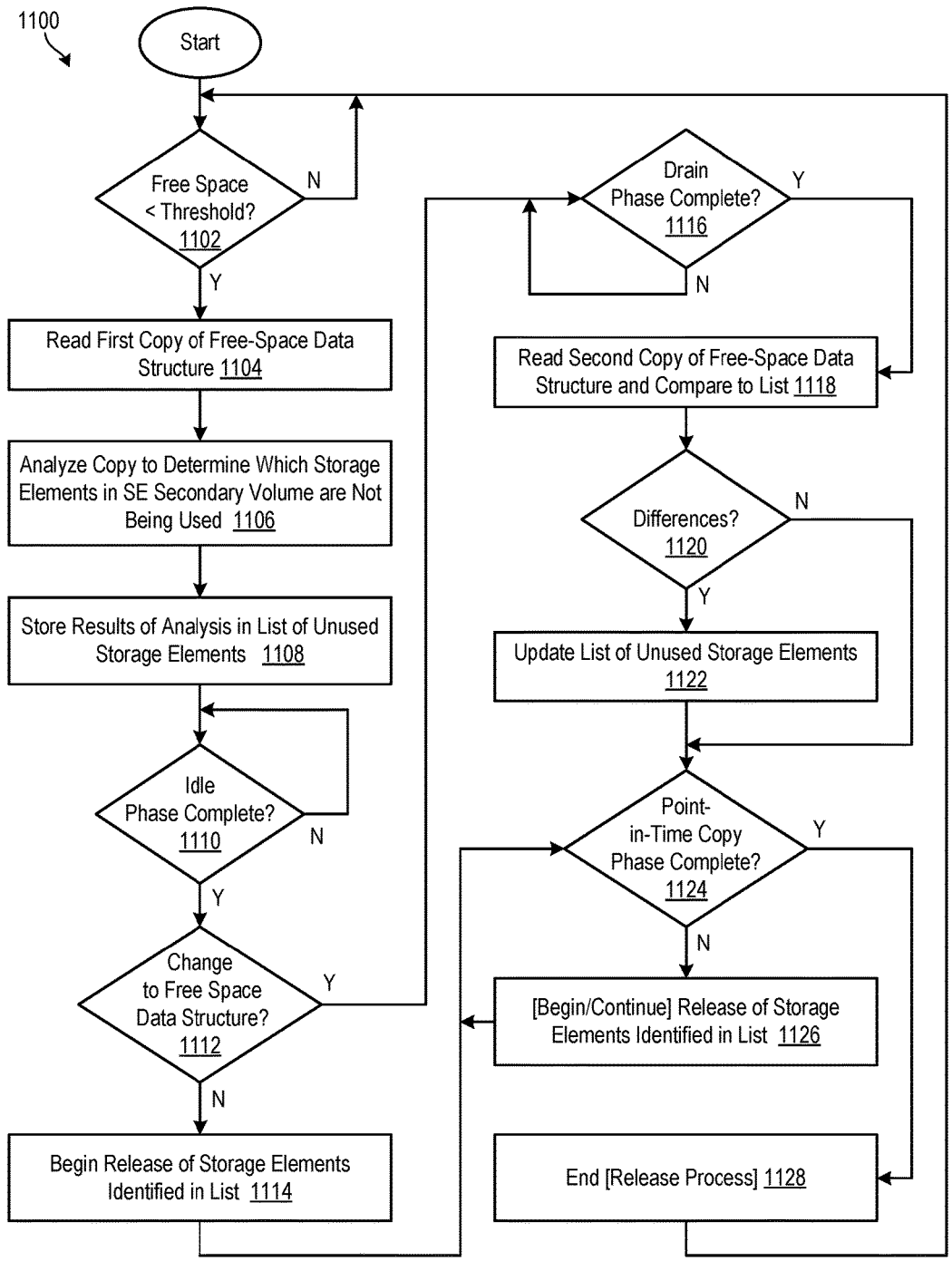
FIG. 11 is a process flow diagram showing one embodiment of a method for reclaiming space in asynchronously mirrored space-efficient secondary volumes.

Referring to FIG. 11, one embodiment of a method 1100 for releasing storage space in an asynchronously mirrored space-efficient secondary volume is illustrated. As shown, the method 1100 initially determines 1102 whether free space on the secondary storage system 110b has fallen below a threshold. If so, the method 1100 reads 1104 a first copy of the VTOC 304, and more particularly a first copy of the free-space data structure in the VTOC 304, into memory. This may be accomplished by reading the track or other storage element that contains the VTOC 304 into memory. The method 1100 then analyzes 1106 the first copy to determine which storage elements in the space-efficient secondary volume 300b are not being used. This step 1106 may include analyzing free space descriptor DSCBs 504 and/or a free space bitmap 506 in the VTOC 304 to determine which storage elements (e.g., tracks) are unused. The method 1100 stores 1108 the results of this analysis in the list 918 of unused storage elements.

The method 1100 then waits 1110 for the idle phase to complete (indicating that a consistency group is complete on the space-efficient primary volume 300a), if it has not already completed. When the idle phase completes, the method 1100 determines 1112 whether the free-space data structure in the VTOC 304 was changed at the primary storage system 110a. This may be accomplished by analyzing the change recording bitmap 902 (which converts to the out-of sync bitmap 904 upon initiating the drain phase). Specifically, this may be accomplished by analyzing the bit in the change recording bitmap 902 that documents updates to the storage element (e.g., track) storing the VTOC 304. If the free-space data structure has not changed, then the method 1100 may immediately begin 1114 to release, from the space-efficient secondary volume 300b, storage elements identified in the list 918 of unused storage elements. This is because the VTOC 304 on the secondary storage system 110b will not change during the drain phase and the VTOC 304 on the secondary storage system 110b accurately represents data on the space-efficient secondary volume 300b.

If, at step 1112, the free-space data structure has changed at the primary storage system 110a, the method 1100 waits 1116 for the drain phase to complete. This allows the VTOC 304 to be copied over to the secondary storage system 110b. When the drain phase completes, the method 1100 reads 1118 a second copy of the VTOC 304 on the space-efficient secondary volume 300b. The method 1100 then compares 1118 the list 918 of unused storage elements to the second copy of the VTOC 304 to determine if any storage elements in the space-efficient secondary volume 300b had a change in usage status (e.g., transitioned from used to unused, unused to used, etc.), or if any new storage elements were allocated to the space-efficient secondary volume 300b during the analysis 1106. If, at step 1120, the method finds 1120 differences between what is recorded in the list 918 and what is recorded in the second copy of the VTOC 304, the method 1100 updates 1122 the list 918 of unused storage elements to reflect the changes. In certain embodiments, updating 1122 the list 918 may include removing, from the list 918, any unused storage elements that are associated with changes to the VTOC 304 (since these unused storage elements may have become used).

The method 1100 then determines 1124 whether the point-in-time-copy phase has completed. If the point-in-time-copy phase has not completed, the method 1100 either begins 1126 to release storage elements identified in the list 918 (if this process has not already started) or continues 1126 to release storage elements identified in the list 918 if, for example, the release process already started at step 1114. This release process continues until all storage elements identified in the list 918 are released from the space-efficient secondary volume 300b, or the point-in-time-copy phase completes. If the point-in-time-copy phase completes before all space has been released, the method 1100 ends 1128 the release process. If the release process finishes before the point-in-time-copy phase completes, the method 1100 simply ends 1128.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for releasing storage space in asynchronously mirrored space-efficient secondary volumes, the method comprising:
    reading a first copy of a free-space data structure stored on a space-efficient secondary volume, the free-space data structure tracking usage status of storage elements in the space-efficient secondary volume;
    analyzing the first copy to determine which storage elements in the space-efficient secondary volume are not being used;
    waiting for a consistency group to be completely replicated to the space-efficient secondary volume;
    when the consistency group is completely replicated to the space-efficient secondary volume, reading a second copy of the free-space data structure;
    comparing the first copy to the second copy to determine which storage elements had their usage status change during analysis of the first copy;
    releasing, during a point-in-time-copy phase wherein a snapshot is taken of the space-efficient secondary volume, storage elements in the space-efficient secondary volume that are not being used; and
    terminating the release of storage elements upon completion of the point-in-time-copy phase, regardless of whether all storage elements that are not being used have been released from the space-efficient secondary volume.

2. The method of claim 1, wherein the storage elements are tracks.

3. The method of claim 1, wherein the free-space data structure is a bitmap comprising a bit for each track in the space-efficient secondary volume.

4. The method of claim 1, wherein the free-space data structure is contained within a volume table of contents (VTOC) stored on the space-efficient secondary volume.

5. The method of claim 1, wherein analyzing the first copy comprises generating a list of unused storage elements in the space-efficient secondary volume.

6. A computer program product to release storage space in asynchronously mirrored space-efficient secondary volumes, the computer program product comprising a nontransitory computer-readable storage medium having computer-usable program code embodied therein, the computer-usable program code comprising:
  computer-usable program code to read a first copy of a free-space data structure stored on a space-efficient secondary volume, the free-space data structure tracking usage status of storage elements in the space-efficient secondary volume;
  computer-usable program code to analyze the first copy to determine which storage elements in the space-efficient secondary volume are not being used;
  computer-usable program code to wait for a consistency group to be completely replicated to the space-efficient secondary volume;
  computer-usable program code to, when the consistency group is completely replicated to the space-efficient secondary volume, read a second copy of the free-space data structure;
  computer-usable program code to compare the first copy to the second copy to determine which storage elements had their usage status change during analysis of the first copy; and
  computer-usable program code to release, during a point-in-time-copy phase wherein a snapshot is taken of the space-efficient secondary volume, storage elements in the space-efficient secondary volume that are not being used; and
  computer-usable program code to terminate the release of storage elements upon completion of the point-in-time-copy phase, regardless of whether all storage elements that are not being used have been released from the space-efficient secondary volume.

7. The computer program product of claim 6, wherein the storage elements are tracks.

8. The computer program product of claim 6, wherein the free-space data structure is a bitmap comprising a bit for each track in the space-efficient secondary volume.

9. The computer program product of claim 6, wherein the free-space data structure is contained within a volume table of contents (VTOC) stored on the space-efficient secondary volume.

10. The computer program product of claim 6, wherein analyzing the first copy comprises generating a list of unused storage elements in the space-efficient secondary volume.

11. A system to release storage space in asynchronously mirrored space-efficient secondary volumes, the system comprising:
  at least one processor;
  at least one memory device operably coupled to the at least one processor and storing instructions for execution on the at least one processor, the instructions causing the at least one processor to:
    read a first copy of a free-space data structure stored on a space-efficient secondary volume, the free-space data structure tracking usage status of storage elements in the space-efficient secondary volume;
    analyze the first copy to determine which storage elements in the space-efficient secondary volume are not being used;
    wait for a consistency group to be completely replicated to the space-efficient secondary volume;
    when the consistency group is completely replicated to the space-efficient secondary volume, read a second copy of the free-space data structure;
    compare the first copy to the second copy to determine which storage elements had their usage status change during analysis of the first copy;
    release, during a point-in-time-copy phase wherein a snapshot is taken of the space-efficient secondary volume, storage elements in the space-efficient secondary volume that are not being used; and
    terminate the release of storage elements upon completion of the point-in-time-copy phase, regardless of whether all storage elements that are not being used have been released from the space-efficient secondary volume.

12. The system of claim 11, wherein the storage elements are tracks.

13. The system of claim 11, wherein the free-space data structure is a bitmap comprising a bit for each track in the space-efficient secondary volume.

14. The system of claim 11, wherein the free-space data structure is contained within a volume table of contents (VTOC) stored on the space-efficient secondary volume.

* * * * *